US012451504B2

(12) United States Patent
Weingaertner

(10) Patent No.: US 12,451,504 B2
(45) Date of Patent: Oct. 21, 2025

(54) FUEL CELL SYSTEM INCLUDING ALCOHOL VAPORIZATION COMPONENTS AND METHOD OF OPERATING THE SAME

(71) Applicant: BLOOM ENERGY CORPORATION, San Jose, CA (US)

(72) Inventor: David Weingaertner, Sunnyvale, CA (US)

(73) Assignee: BLOOM ENERGY CORPORATION, San Jose, CA (US)

( * ) Notice: Subject to any disclaimer, the term of this patent is extended or adjusted under 35 U.S.C. 154(b) by 0 days.

(21) Appl. No.: 18/883,766

(22) Filed: Sep. 12, 2024

(65) Prior Publication Data
US 2025/0105325 A1 Mar. 27, 2025

Related U.S. Application Data

(60) Provisional application No. 63/584,987, filed on Sep. 25, 2023.

(51) Int. Cl.
H01M 8/1011 (2016.01)
H01M 8/04007 (2016.01)
H01M 8/04014 (2016.01)
H01M 8/04029 (2016.01)
H01M 8/04082 (2016.01)
H01M 8/04089 (2016.01)
H01M 8/04225 (2016.01)
H01M 8/0662 (2016.01)
H01M 8/12 (2016.01)
H01M 8/1231 (2016.01)
H01M 8/1233 (2016.01)

(52) U.S. Cl.
CPC ..... *H01M 8/1013* (2013.01); *H01M 8/04014* (2013.01); *H01M 8/04029* (2013.01); *H01M 8/04059* (2013.01); *H01M 8/04097* (2013.01); *H01M 8/04201* (2013.01); *H01M 8/04225* (2016.02); *H01M 8/0662* (2013.01); *H01M 8/1011* (2013.01); *H01M 8/1231* (2016.02); *H01M 8/1233* (2013.01); *H01M 2008/1293* (2013.01)

(58) Field of Classification Search
None
See application file for complete search history.

(56) References Cited

U.S. PATENT DOCUMENTS 6,230,494 B1 * 5/2001 Botti ......... F02B 1/12
60/737
6,299,996 B1 * 10/2001 White ......... H01M 8/2483
429/479
7,108,932 B2 9/2006 Iwasaki et al.
(Continued)

OTHER PUBLICATIONS

EPO Office Communication, Extended European Search Report for European Patent Application No. 24199921.8, mailed Jan. 13, 2025, 14 pages.

*Primary Examiner* — Ula C Ruddock
*Assistant Examiner* — Mary Grace Byram
(74) *Attorney, Agent, or Firm* — THE MARBURY LAW GROUP PLLC

(57) ABSTRACT

A method of operating a fuel cell system includes vaporizing a liquid fuel in a vaporizer located in a hot box using heat generated by the fuel cell system to form a fuel vapor, and providing the fuel vapor to a stack of fuel cells located in the hot box to generate power.

14 Claims, 8 Drawing Sheets

(56) References Cited

U.S. PATENT DOCUMENTS

| | | |
|---|---|---|
| 8,273,487 B2 | 9/2012 | Gottmann |
| 8,445,146 B2 | 5/2013 | Gottmann |
| 9,680,175 B2 | 6/2017 | Venkataraman et al. |
| 11,196,068 B2 | 12/2021 | Weingaertner et al. |
| 2003/0054215 A1 | 3/2003 | Doshi et al. |
| 2004/0086765 A1* | 5/2004 | Florence ........... H01M 8/04089 |
| | | 429/434 |
| 2009/0176134 A1* | 7/2009 | Jahnke .............. H01M 8/04291 |
| | | 429/413 |
| 2012/0164547 A1 | 6/2012 | Weingaertner et al. |
| 2012/0196194 A1 | 8/2012 | Perry et al. |
| 2020/0243885 A1* | 7/2020 | Weingaertner ...... H01M 8/0662 |
| 2020/0328445 A1 | 10/2020 | Weingaertner et al. |
| 2023/0142906 A1 | 5/2023 | Petrucha et al. |

* cited by examiner

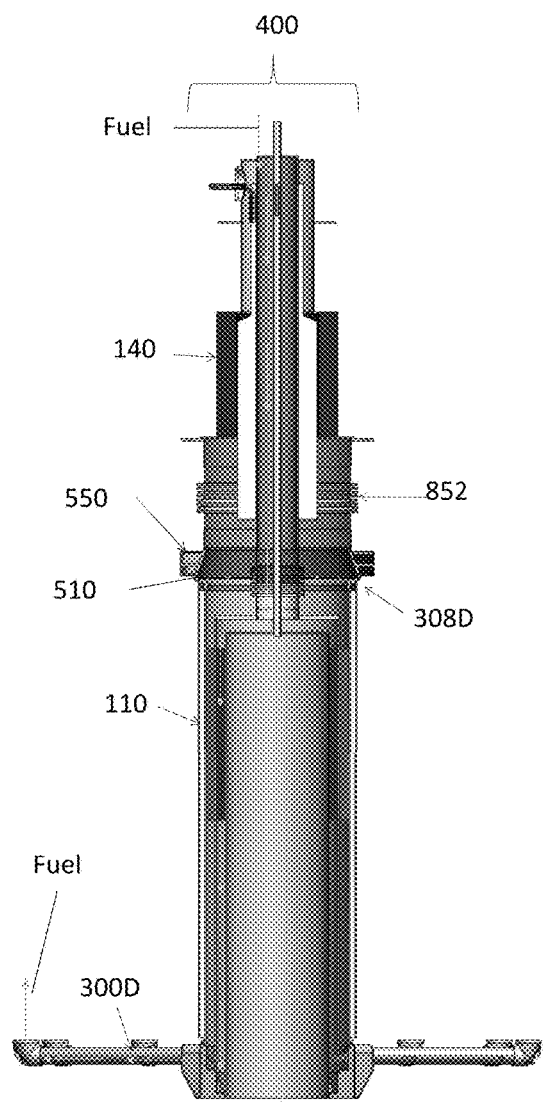
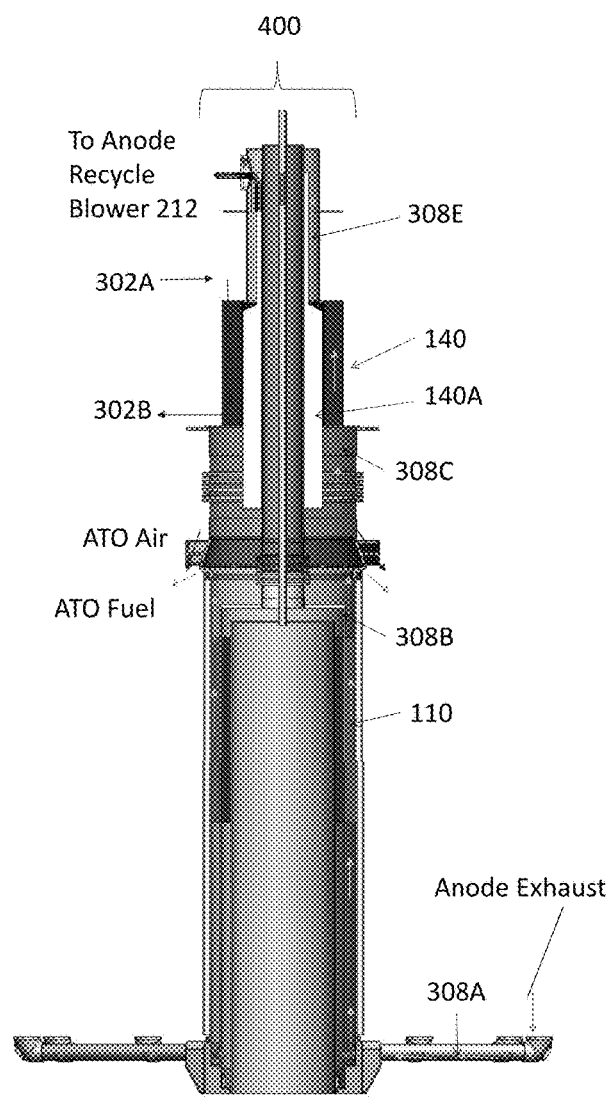
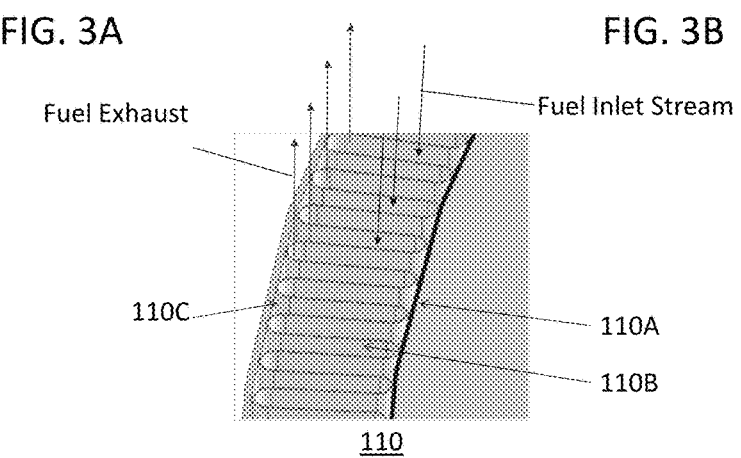
FIG. 3A
FIG. 3B
FIG. 3C

FUEL CELL SYSTEM INCLUDING ALCOHOL VAPORIZATION COMPONENTS AND METHOD OF OPERATING THE SAME

FIELD

Aspects of the present invention relate to fuel cell systems and methods, and more particularly, to fuel cell systems including alcohol vaporization components configured to provide a fuel stream comprising vaporized alcohol to a fuel cell stack.

BACKGROUND

Fuel cells, such as solid oxide fuel cells (SOFCs), are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide regenerative fuel cells, that also allow reversed operation, such that oxidized fuel can be reduced back to unoxidized fuel using electrical energy as an input.

SUMMARY

According to some embodiments of the present disclosure, a method of operating a fuel cell system includes vaporizing a liquid fuel in a vaporizer located in a hot box using heat generated by the fuel cell system to form a fuel vapor, and providing the fuel vapor to a stack of fuel cells located in the hot box to generate power.

According to some embodiments of the present disclosure, a fuel cell system comprises a stack of fuel cells located in a hot box; an anode exhaust conduit configured to receive an anode exhaust generated by the stack; a vaporizer located in the hot box and configured to vaporize a liquid fuel using heat generated by the fuel cell system to form a fuel vapor; and a fuel stream conduit configured to provide the fuel vapor to the stack.

BRIEF DESCRIPTION OF THE DRAWINGS

The accompanying drawings, which are incorporated herein and constitute part of this specification, illustrate example embodiments of the invention and, together with the general description given above and the detailed description given below, explain the features of the invention.

FIGS. 3A-3C are sectional views showing fuel and air flow through the central column of the system of FIG. 2A, according to various embodiments of the present disclosure.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

Ranges can be expressed herein as from "about" one particular value, and/or to "about" another particular value. When such a range is expressed, examples include from the one particular value and/or including the other particular value. In some embodiments, a value of "about X" may include values of +/−1% X. It will be further understood that the endpoints of each of the ranges are significant both in relation to the other endpoint, and independently of the other endpoint.

Fuel cell systems may operate using a variety of gaseous fuels ranging from hydrogen ($H_2$) to hydrocarbon fuels, such as natural gas, etc. In general, such fuels are derived from fossil fuel sources. In an effort to reduce greenhouse gas emissions, renewable fuel sources have recently gained attention. For example, various alcohols, such as ethanol, methanol, isopropanol, butanol, etc., may be generated from renewable sources (e.g., biomass, recycled oils, and/or other organic waste) and used as fuels. However, such alcohols are generally provided in a liquid state, and thus need to be vaporized before being provided to a fuel cell system. Various embodiments provide fuel cell systems containing a vaporizer, such as a liquid fuel injector and/or a liquid fuel heat exchanger, configured to cost effectively vaporize liquid fuel, such as an alcohol fuel, using heat generated by the fuel cell system. In some embodiments, the vaporizer may be located in the same hot box as the fuel cell stacks to provide a compact system which does not require additional external vaporization components located outside the hot box, such external components adding complexity to the fuel cell system and increasing the fuel cell system foot print. In other embodiments, the liquid fuel may include non-alcohol liquid fuel, such as gasoline, jet fuel (e.g., JP-8 fuel), heating oil, diesel fuel (including biodiesel), and other biofuels, such as renewable naptha.

Figure 1A:
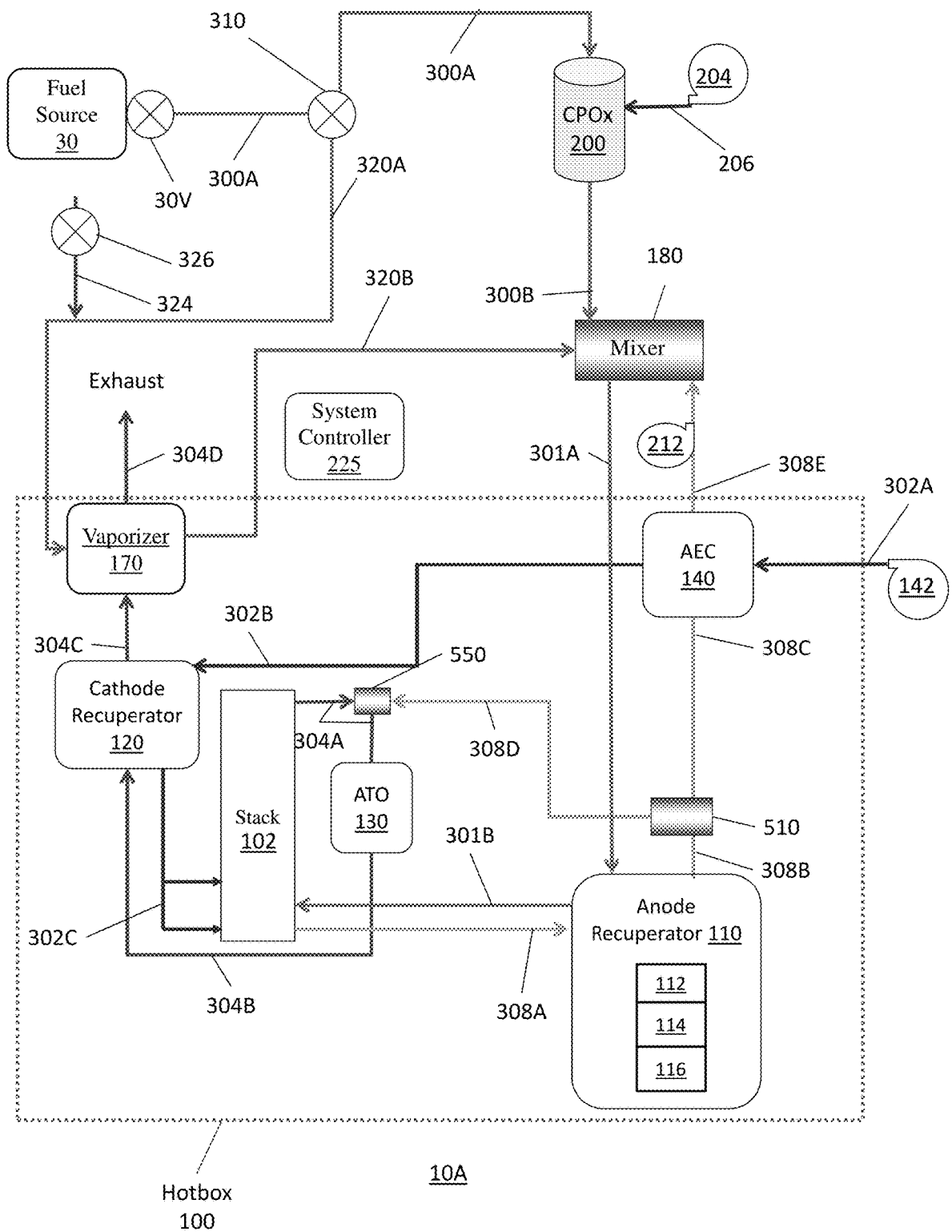
FIGS. 1A, 1B and 1C are schematics of fuel cell systems, according to various embodiments of the present disclosure.

FIG. 1A is a schematic representation of a fuel cell system 10A, according to a first embodiment of the present disclosure. In one embodiment, the fuel cell system 10A may be a SOFC system. Referring to FIG. 1A, the system 10A includes a hotbox 100 and various components disposed therein or adjacent thereto. The hotbox 100 may contain fuel cell stacks 102, such as a solid oxide fuel cell stacks containing alternating fuel cells and interconnects. One solid oxide fuel cell of the stack contains a ceramic electrolyte, such as yttria stabilized zirconia (YSZ), scandia stabilized zirconia (SSZ), scandia and ceria stabilized zirconia or scandia, yttria and ceria stabilized zirconia, an anode electrode, such as a nickel-YSZ, a nickel-SSZ or nickel-doped ceria cermet, and a cathode electrode, such as lanthanum strontium manganite (LSM). The interconnects may be metal alloy interconnects, such as chromium-iron alloy interconnects. The stacks 102 may be arranged over each other in a plurality of columns.

The hotbox 100 may also contain an anode recuperator heat exchanger 110, a cathode recuperator heat exchanger 120, an anode tail gas oxidizer (ATO) 130, an anode exhaust cooler heat exchanger 140, a splitter 510, a vortex generator 550, and a vaporizer which in the first embodiment comprises a liquid fuel heat exchanger 170. The system 10A may also include a mixer 180, a system blower 142 (e.g., air blower), an anode recycle blower 212, and optionally a catalytic partial oxidation (CPOx) reactor 200 and a CPOx blower 204 (e.g., CPOx air blower), which may be disposed outside of the hotbox 100. A CPOx air conduit 206 connects the CPOx reactor 200 to the CPOx blower 204. However, the present disclosure is not limited to any particular location for each of the components with respect to the hotbox 100.

The system 10A may be connected to a liquid fuel source 30, such as a tank or supply line containing a liquid fuel, such as an alcohol liquid fuel, a non-alcohol liquid fuel, or a mixture of alcohol and non-alcohol fuels. The CPOx reactor 200 (if present) receives a fuel stream from the liquid fuel source 30, through fuel inlet conduit 300A. The liquid fuel source 30 may include a valve 30V, which in conjunction with valve 310, can be used to control an amount of fuel provided to the CPOx reactor 200. The CPOx blower 204 may provide air to the CPOx reactor 200 via the CPOx air conduit 206 during system start-up mode. The partially oxidized fuel and optionally remaining air may be provided to the mixer 180 by fuel inlet conduit 300B (which alternatively is referred to as a CPOx outlet conduit herein). A fuel stream output from the mixer 180 and/or recycled anode exhaust flows from the mixer 180 to the anode recuperator 110 through fuel stream conduit 301A. The fuel stream is heated in the anode recuperator 110 by a portion of the anode exhaust (i.e., fuel exhaust) and the fuel then flows from the anode recuperator 110 to the stack 102 through fuel stream conduit 301B.

Figure 1B:
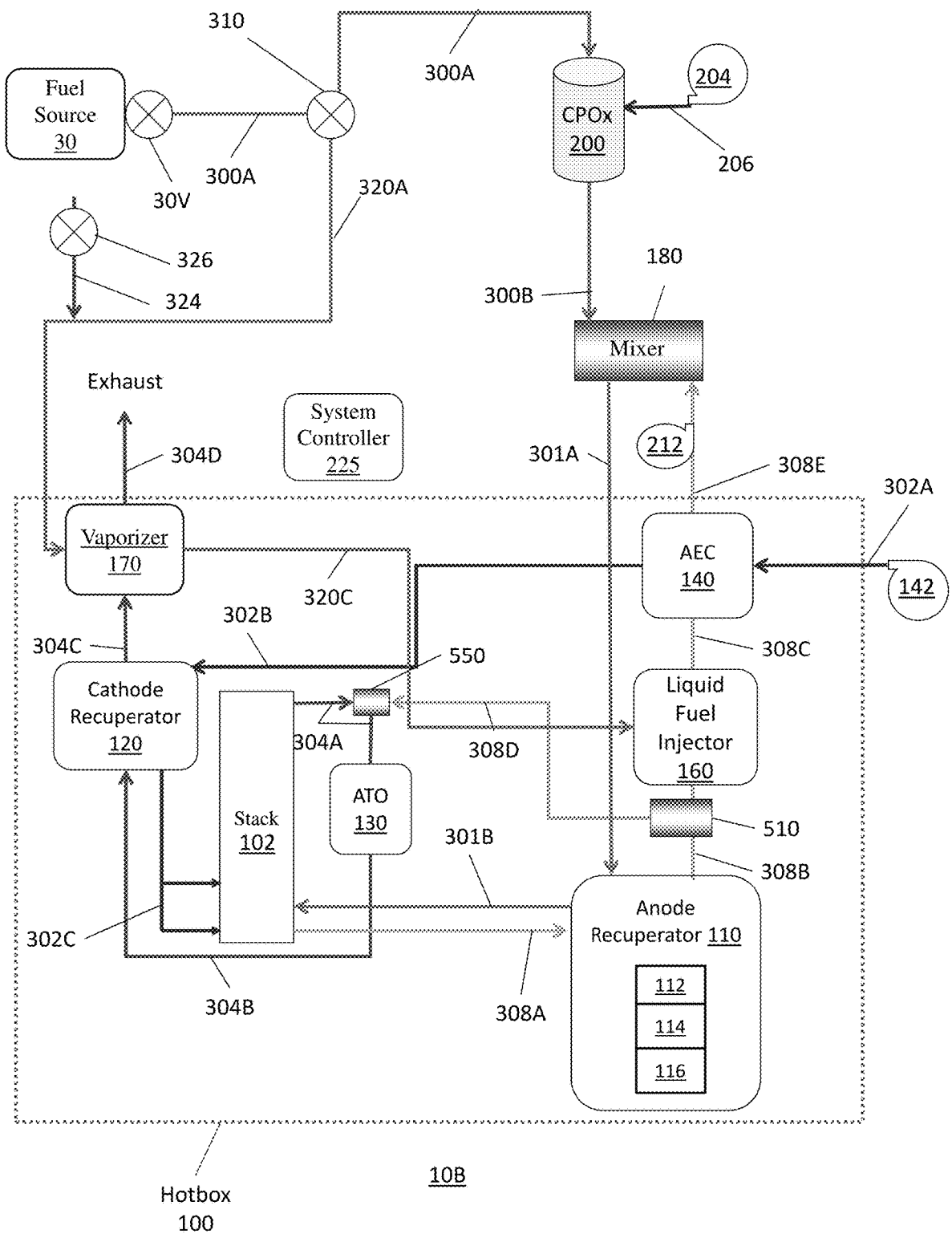
Figure 1C:
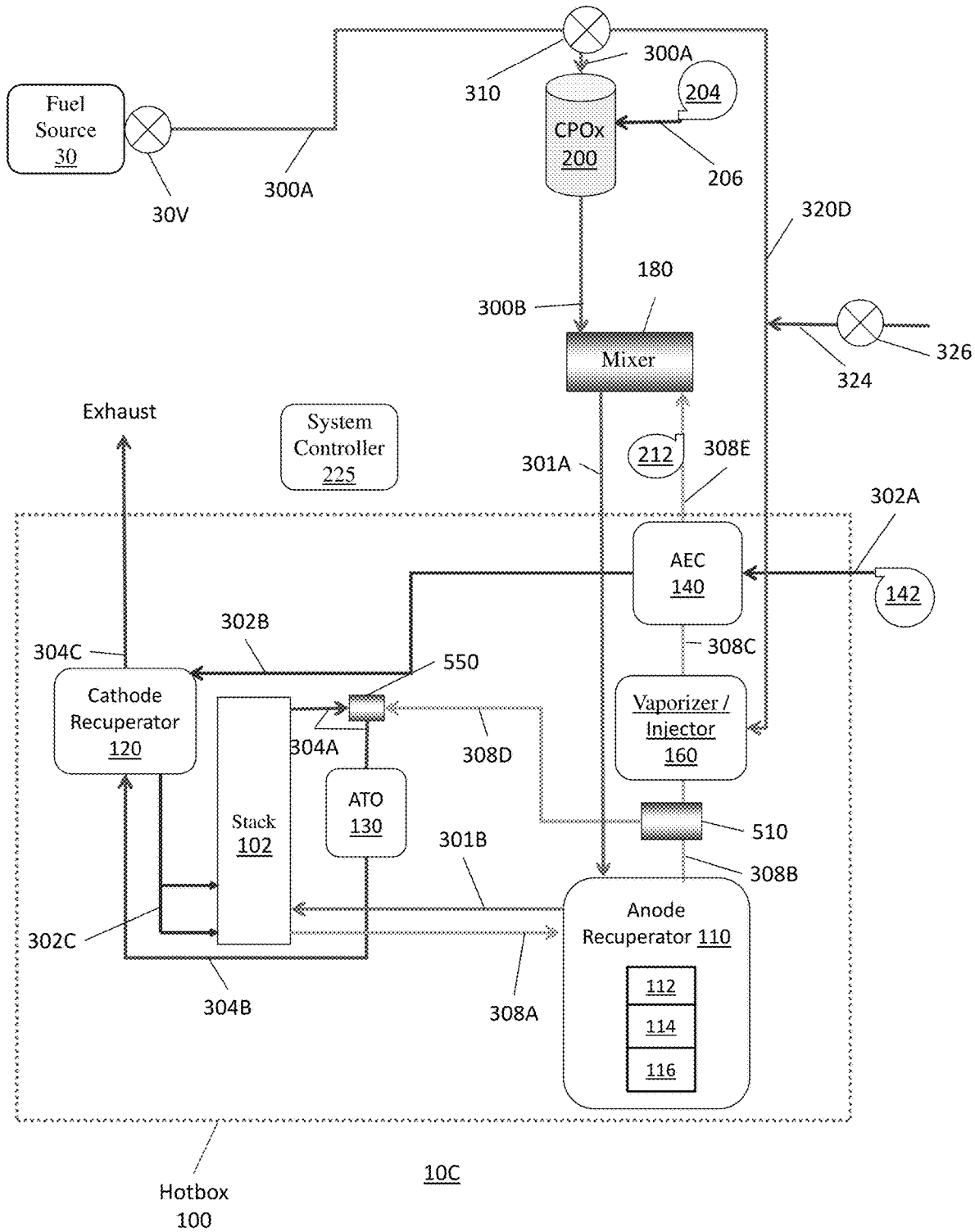

If the CPOx reactor 200 is operated only during the start-up of the systems 10A, 10B and 10C shown in FIG. 1A, 1B or 1C, the CPOx reactor 200 may function as the liquid fuel vaporizer during the start-up mode of the systems. Thus, during the start-up mode, a fuel valve 310 is actuated to provide the fuel from the fuel source 30 to the CPOx reactor 200 via the fuel inlet conduit 300A, while respective vaporizer conduits 320A (FIG. 1A or 1B), or 320D (FIG. 1C) are closed. During a steady-state mode, the CPOx air blower 204 is turned off, and the liquid fuel may bypass the CPOx reactor 200 by actuating the fuel valve 310 such that the liquid fuel is provided from the fuel source 30 to the liquid fuel injector 160 and/or a liquid fuel heat exchanger 170 (also referred to as a vaporizer) via the respective vaporizer conduits 320D or 320A, while the portion of the fuel inlet conduit 300A located between the fuel valve 310 and the CPOx reactor 200 is closed. Thus, during the steady-state mode, the liquid fuel injector 160 and/or a liquid fuel heat exchanger 170 function as the vaporizer.

The main air blower 142 may be configured to provide an air stream (e.g., air inlet stream) to the anode exhaust cooler 140 through air conduit 302A. Air flows from the anode exhaust cooler 140 to the cathode recuperator 120 through air conduit 302B. The air is heated by the system exhaust in the cathode recuperator 120. The air flows from the cathode recuperator 120 to the stack 102 through air conduit 302C.

An anode exhaust stream (e.g., fuel exhaust stream) generated in the stack 102 is provided to the anode recuperator 110 through anode exhaust conduit 308A. The anode exhaust may contain unreacted fuel and may also be referred to herein as fuel exhaust. The anode exhaust may be provided from the anode recuperator 110 to the splitter 510 by anode exhaust conduit 308B. A first portion of the anode exhaust may be provided from the splitter 510 to the anode exhaust cooler 140 through the anode exhaust conduit 308C. A second portion of the anode exhaust is provided from the splitter 510 to the ATO 130 through the anode exhaust conduit 308D. The first portion of the anode exhaust heats the air inlet stream in the anode exhaust cooler 140 and may then be provided from the anode exhaust cooler 140 to the mixer 180 through the anode exhaust conduit 308E. The anode recycle blower 212 may be configured to move anode exhaust though anode exhaust conduit 308E, as discussed below.

Cathode exhaust generated in the stack 102 flows to the ATO 130 through cathode exhaust conduit 304A. The vortex generator 550 may be disposed in cathode exhaust conduit 304A and may be configured to swirl the cathode exhaust. The anode exhaust conduit 308D may be fluidly connected to the vortex generator 550 or to the cathode exhaust conduit 304A or the ATO 130 downstream of the vortex generator 550. The swirled cathode exhaust may mix with the second portion of the anode exhaust provided by the splitter 510 before being provided to the ATO 130. The cathode exhaust mixture (i.e., the system exhaust) may be oxidized in the ATO 130. The oxidized exhaust (i.e., the oxidized system exhaust) then flows to the cathode recuperator 120 through cathode exhaust conduit 304B. The system exhaust flows from the cathode recuperator 120 to the liquid fuel heat exchanger 170 through cathode exhaust conduit 304C and then out of the hotbox 100 through cathode exhaust conduit 304D. The cathode exhaust conduit 304C fluidly connects an outlet of the cathode recuperator heat exchanger 120 to an inlet of the liquid fuel heat exchanger 170.

The system 10A may further a system controller 225 configured to control various elements of the system 10A. The controller 225 may include a central processing unit configured to execute stored instructions. For example, the controller 225 may be configured to control fuel and/or air flow through the system 10A, according to fuel composition data.

Figure 1D:
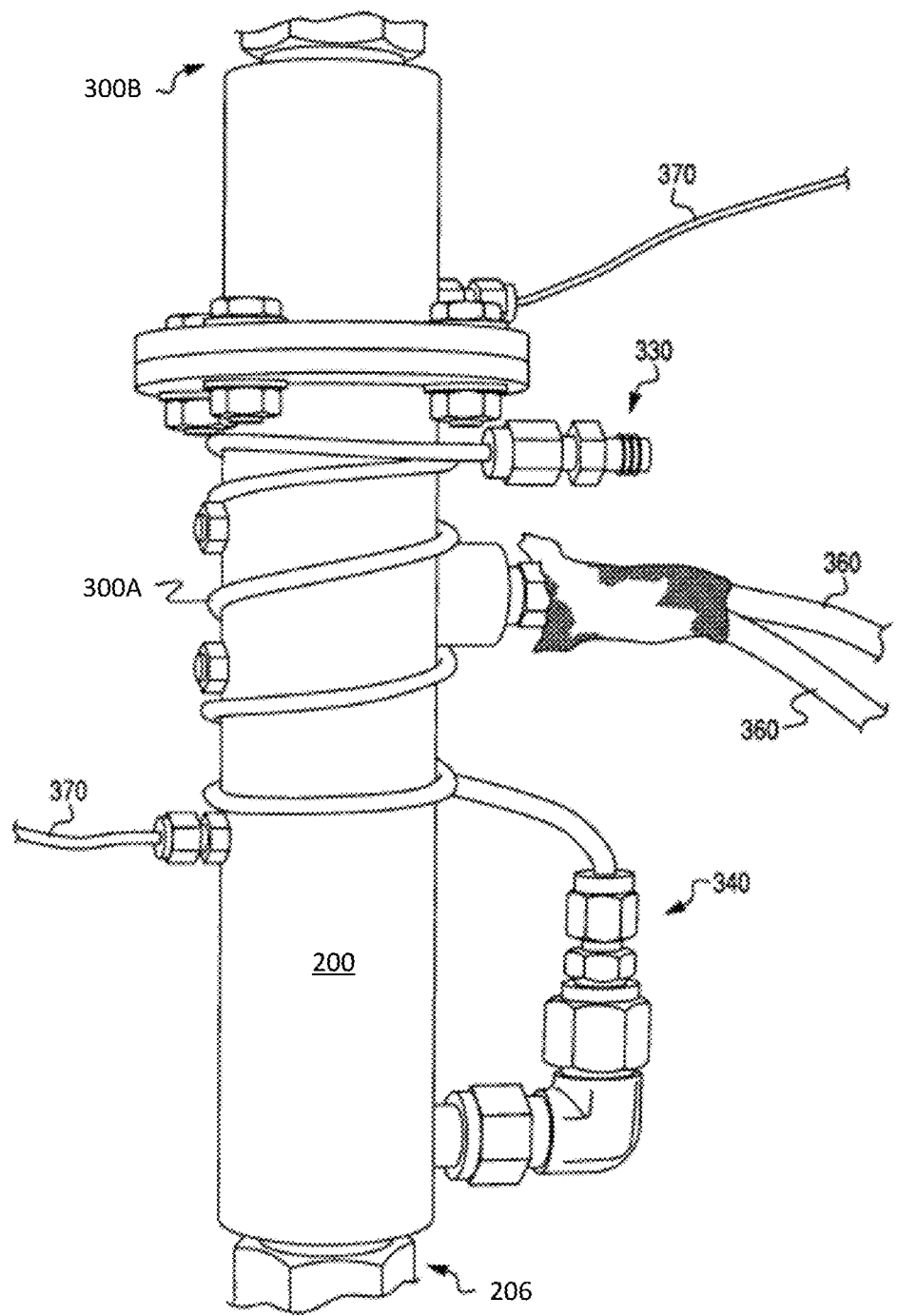
FIG. 1D is a perspective view of a CPOx reactor of the fuel cell systems of FIGS. 1A, 1B and 1C, according to various embodiments of the present disclosure.

FIG. 1D depicts a non-limiting example of a CPOx reactor 200 according to various embodiments of the present disclosure. The CPOx reactor 200 may comprise the CPOx reactor described in U.S. Pat. No. 9,680,175 B2, issued on Jun. 13, 2017, and incorporated herein by reference in its entirely. The fuel inlet conduit 300A is wrapped around the tubular body of the CPOX reactor 200 which contains the CPOx catalyst. Liquid fuel is fed into the fuel inlet conduit 300A through an inlet 330 of the fuel inlet conduit 300A and the vaporized (or partially vaporized) fuel is fed from an outlet 340 of the fuel inlet conduit 300A into the CPOx reactor 200. Air is provided to the CPOX reactor 200 from the CPOx blower 204 via a CPOx air conduit 206 to run the CPOx reaction. The partially oxidized fuel is fed from the CPOx fuel outlet conduit 300B to the fuel cell stack(s). FIG. 1D also shows the electrical leads 360 for an optional glow plug that can be used for initial heating of the CPOX reactor and thermocouple leads 370 for a thermocouple that may be used to measure a temperature of the CPOx reactor 200. The heat from the CPOx reactor 200 generated by the CPOx reaction and/or by the glow plug is used to vaporize the liquid fuel in the fuel inlet conduit 300A which is wrapped around the CPOx reactor 200. An optional heater (e.g., electric heater) may be provided around the fuel inlet conduit 300A to provide additional heating to the liquid fuel in the fuel inlet conduit 300A. While FIG. 1D depicts the glow plug located at the middle of the CPOx reactor 200, the glow plug can also be located closer to either end of the CPOx reactor 200.

While a coiled pipe shaped fuel inlet conduit 300A is shown in FIG. 1D, in an alternative configuration, the liquid fuel is fed to a jacket located around the CPOX reactor, around the CPOX outlet conduit 300B or both. The jacket may comprise a shell located concentrically around the CPOX reactor and/or outlet conduit 300B. In yet another alternative configuration, a liquid fuel is fed to one or more tubes that run inside the CPOX reactor. In this configuration, the CPOX reactor comprises a concentric shell located around the fuel inlet tube.

Figures 2A, 2B:
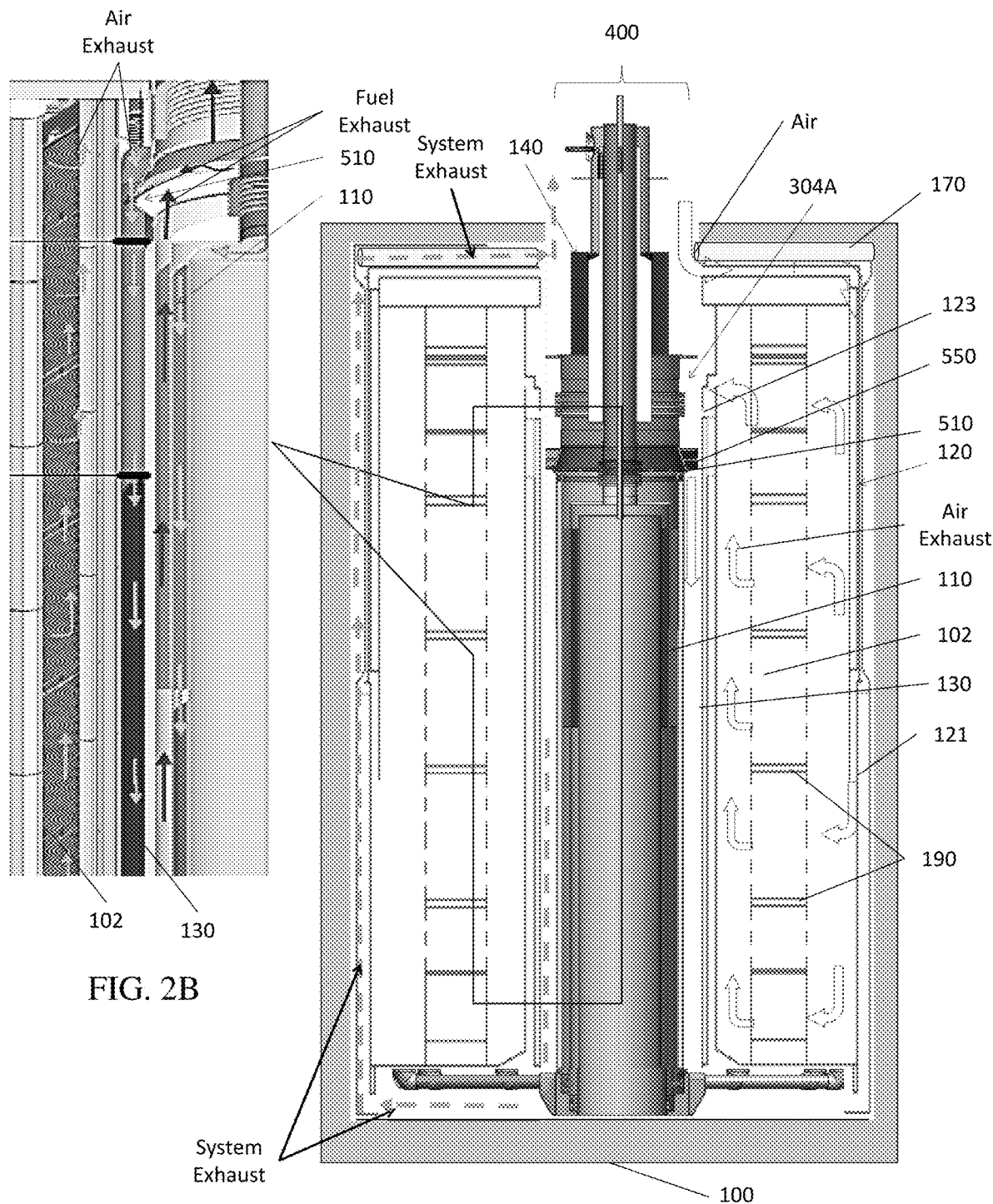
FIG. 2A is a sectional view showing components of the hotbox of the system of FIGS. 1A, 1B and 1C.
FIG. 2B shows an enlarged portion of the system of FIG. 2A, according to various embodiments of the present disclosure.

FIG. 2A is a sectional view showing components of the hotbox 100 of the systems 10A and 10B of FIGS. 1A, 1B and 1C, and FIG. 2B shows an enlarged portion of FIG. 2A. Referring to FIGS. 1A, 1B, 1C 2A and 2B, the fuel cell stacks 102 may be disposed around the central column 400 in the hotbox 100. For example, the stacks 102 may be disposed in a ring configuration around the central column 400 and may be positioned on the base of the hotbox 100. While multiple stacks 102 are configured in a single vertical arrangement with multiple anode splitter plates 190 as depicted in FIG. 2A, it is understood that fuel cells could be arranged in a single column without anode splitter plates with multiple columns configured around the central column 400. The central column 400 may include the anode recuperator 110, the ATO 130, and the anode exhaust cooler 140. In particular, the anode recuperator 110 is disposed radially inward of the ATO 130, and the anode exhaust cooler 140 is mounted over the anode recuperator 110 and the ATO 130. In one embodiment, an optional oxidation catalyst 112 and/or an optional hydrogenation catalyst 114 may be located in the anode recuperator 110. An optional reforming catalyst 116 may also be located at the bottom of the anode recuperator 110 as a steam methane reformation (SMR) insert. The vortex generator 550 and fuel exhaust splitter 510 are located over the anode recuperator 110 and ATO 130 and below the anode exhaust cooler 140.

As shown by the arrows in the upper right-hand side of FIG. 2A, air enters the top of the hotbox 100 and then flows into the cathode recuperator 120 where it is heated by system exhaust output from the ATO 130. The heated air then flows inside the cathode recuperator 120 through a first vent or opening 121. The air then flows through the stacks 102 and reacts with fuel (i.e., fuel inlet stream) provided to the stack 102. Air exhaust flows from the stacks 102, through a second vent or opening 123. The air exhaust then passes through vanes of the vortex generator 550 and is swirled before entering the ATO 130.

The splitter 510 may direct the second portion of the fuel exhaust exiting the top of the anode recuperator 100 through openings (e.g., slits) in the splitter into the swirled air exhaust (e.g., in the vortex generator 550 or downstream of the vortex generator in cathode exhaust conduit 304A or in the ATO 130). As illustrated in FIG. 2A, the fuel and air exhaust are mixed before entering the ATO 130.

FIGS. 3A and 3B are side cross-sectional views showing flow distribution through the central column 400, and 3C is a sectional perspective view taken through the anode recuperator 110. Referring to FIGS. 1A, 1B, 1C, 2A, 2B, 3A, and 3C, the anode recuperator 110 includes an inner cylinder 110A, a corrugated plate 110B, and an outer cylinder 110C that may be coated with the ATO insulation. Fuel from fuel stream conduit 301A enters the top of the central column 400. The fuel then bypasses the anode exhaust cooler 140 by flowing through its hollow core and then flows through the anode recuperator 110, between the outer cylinder 110C and the and the corrugated plate 110B. The fuel then flows to the stacks 102 through conduits 300D.

Referring to FIGS. 2A, 2B, 3A, and 3B, the fuel exhaust flows from the stacks 102, through conduits 308A, the anode recuperator 110, conduit 308B, and into the splitter 510. A first portion of the fuel exhaust flows from the splitter 510 to the anode exhaust cooler 140 through conduit 308C, while a second portion flows from the splitter 510 to the ATO 130 through conduit 308D, as shown in FIGS. 1A, 1B and 1C.

FIG. 3B also shows air flowing from the air conduit 302A to the anode exhaust cooler 140 (where it is heated by the first portion of the anode exhaust) and then from the anode exhaust cooler 140 through air conduit 302B to the cathode recuperator 120. The first portion of the anode exhaust is cooled in the anode exhaust cooler 140 by the air flowing through the anode exhaust cooler 140. The cooled first portion of the anode exhaust is then provided from the anode exhaust cooler 140 to the anode recycle blower 212 shown in FIGS. 1A, 1B and 1C.

The relative amounts of anode exhaust provided to the ATO 130 and the anode exhaust cooler 140 are controlled by the anode recycle blower 212. The higher the blower 212 speed, the larger percentage of the anode exhaust is provided into conduit 308C, and a smaller percentage of the anode exhaust is provided to the ATO 130 via conduit 308D, and vice-versa.

The anode exhaust provided to the ATO 130 is not cooled in the anode exhaust cooler 140. This allows higher temperature anode exhaust to be provided into the ATO 130 than if the anode exhaust were provided after flowing through the anode exhaust cooler 140. For example, the anode exhaust provided into the ATO 130 from the splitter 510 may have a temperature of above 350° C., such as from about 350 to about 500° C., for example, from about 375 to about 425° C., or from about 390 to about 410° C. Furthermore, since a smaller amount of anode exhaust is provided into the anode exhaust cooler 140 (e.g., not 100% of the anode exhaust is provided into the anode exhaust cooler due to the splitting of the anode exhaust in splitter 510), the heat exchange area of the anode exhaust cooler 140 may be reduced. The anode exhaust provided to the ATO 130 may be oxidized by the cathode (i.e., air) exhaust and the ATO 130 exhaust provided to the cathode recuperator 120 through cathode exhaust/ATO exhaust conduit 304B.

Liquid Fuel Vaporization

Referring to FIGS. 1A, 1B, 1C, 2A and 2B, and according to a first embodiment, the liquid fuel source 30 may contain a liquid fuel, such as an alcohol fuel, such as ethanol, methanol, isopropanol, butanol, mixtures thereof, etc., or a non-alcohol liquid fuel, such as gasoline, jet fuel (e.g., JP-8 fuel), heating oil, diesel fuel (including biodiesel), and other biofuels, such as renewable naptha. Alternatively, the liquid fuel source may contain a mixture of alcohol and non-alcohol liquid fuels, such as a mixture of ethanol and gasoline, for example.

The system 10A may be configured to vaporize the liquid fuel (i.e., the liquid fuel stream) provided from the liquid fuel source 30 prior to the liquid fuel being provided to the stack 102. For example, in some embodiments, at least a portion of the liquid fuel provided to the system 10A may be vaporized in the anode recuperator 110. However, in some embodiments, the anode recuperator may not be capable of completely vaporizing the liquid fuel provided to the system 10A. Accordingly, the system 10A may utilize the liquid fuel heat exchanger 170 as the vaporizer to vaporize at least a portion of the liquid fuel.

The system 10A may optionally include the fuel valve 310 disposed on fuel inlet conduit 300A. The fuel valve 310 may be configured to divert all or a portion of a liquid fuel stream output from the fuel source 30 to the liquid fuel heat exchanger 170 via vaporizer conduit 320A, which fluidly connects the fuel valve 310 to the liquid fuel heat exchanger 170. Thus, the portion of the fuel inlet conduit 300A downstream of the fuel valve 310 and the fuel inlet conduit 300B may be omitted, or partially or entirely closed off by the valve 310 during one or more operating modes of the system 10A. The air from the CPOx blower 204 may be provided to the CPOx reactor 200 during a start-up mode of the system 10A in order to partially oxidize and thus pre-heat the liquid fuel provided from the liquid fuel source 30. The CPOx blower 204 may be turned off in a steady-state mode during which the system 10A reaches its steady-state operating temperature (e.g., a temperature between 700 and 900° C. for a SOFC system 10A). Thus, during the steady-state mode, the CPOx reactor 200 may be bypassed by actuating the fuel valve 310. Alternatively, the CPOx reactor 200 and the CPOx blower 204 may be omitted entirely. The fuel valve 310 (if present) may be configured to simultaneously or alternately provide liquid fuel streams to the liquid fuel heat exchanger 170 and the mixer 180.

The liquid fuel heat exchanger 170 may comprise any suitable type of gas-liquid heat exchanger (e.g., tube heat exchanger, etc.) configured to heat the liquid fuel stream by extracting heat from system exhaust output from the cathode recuperator 120 via cathode exhaust conduit 304C. The liquid fuel heat exchanger 170 may include a conduit coil (e.g., a coiled tube) disposed below the top cover of the hotbox 100, and the hot system exhaust may flow past the conduit coil prior to exiting the hotbox 100.

In some embodiments, the liquid fuel heat exchanger 170 may be configured to heat the liquid fuel stream to a temperature sufficient to generate a vaporized fuel stream (e.g., to convert at least a portion of the liquid fuel to a gas fuel). For example, the liquid fuel heat exchanger 170 may be configured to heat the liquid fuel stream to at least the vaporization temperature (e.g., boiling point) of the liquid fuel in the stream. In case a commercially available alcohol is used as the liquid fuel, such alcohol generally contains a significant amount of water due to the high affinity of water and alcohol. Therefore, even though the boiling points of ethanol (78.37° C.), methanol (66° C.), and isopropanol (80.3° C.) are all lower that 100° C., it may be desired to heat such alcohol liquid fuel stream to at least about 100° C., in order to insure complete vaporization of the liquid fuel stream.

The vaporized fuel stream (i.e., a fuel vapor) may be output from the liquid fuel heat exchanger 170 to the mixer 180 via vaporizer conduit 320B. In the mixer 180, the vaporized fuel stream may be mixed with anode exhaust output from the anode exhaust cooler 140, and the resultant mixed fuel stream may be provided to the stack 102, after passing through the anode recuperator 110.

A start-up water inlet conduit 324 may be fluidly connected to the vaporizer conduit 320A. During the start-up mode, a water valve 326 on the water inlet conduit 324 is opened to provide liquid water into the vaporizer conduit 320A. The liquid fuel heat exchanger 170 may function as a water vaporizer in the start-up mode, and heat the water above 300° C. to generate steam during the start-up mode. The steam is provided into the mixer 180. During the steady-state mode, the water valve 326 is closed, and the initial steam and/or steam generated during the fuel cell reaction at the anode electrodes of the fuel cells is cycled in the system 10A during the steady-state operation.

FIG. 1B illustrates a system 10B of a second embodiment of the present disclosure. Elements that are the same as those of the system 10A will not be described for brevity. The system 10B of the second embodiment includes an additional liquid fuel injector 160 on the anode exhaust path in addition to the liquid fuel heat exchanger 170. The liquid fuel injector functions as a secondary vaporizer in the second embodiment.

In the second embodiment, the liquid fuel heat exchanger 170 may operate as a preheater and/or partial vaporizer rather than as a full vaporizer. For example, it may be desirable to heat the liquid fuel stream to a lower temperature, (e.g., a temperature that is less than the vaporization temperature of the stream). For example, higher temperature system exhaust may be desirable if the system 10B is configured as a combined heat and power system designed to extract heat from the system exhaust in cathode exhaust conduit 304D for other uses, such as heating a building or heating another industrial or chemical process. In the second embodiment, the liquid fuel heat exchanger 170 may be configured to preheat the liquid fuel stream to a temperature of less than about 100° C., such as a temperature ranging from about 50° C. to about 95° C., from about 60° C. to 90° C., or from about 70° C. to 80° C. Furthermore, as described above, the liquid fuel heat exchanger 170 may also function as a water vaporizer or preheater during the start-up mode of the system 10B, for the water provided from the water inlet conduit 324 into the liquid fuel heat exchanger 170.

The preheated liquid fuel stream output from the liquid fuel heat exchanger 170 may be provided to the liquid fuel injector 160 via vaporizer conduit 320C. The vaporizer conduit 320C fluidly connects an outlet of the liquid fuel heat exchanger 170 to an inlet of the liquid fuel injector 160. The liquid fuel injector 160 may be configured to inject the preheated liquid fuel directly into the anode exhaust flowing though anode exhaust conduit 308C. Heat from the anode exhaust (also referred to as a recycled anode exhaust stream) flowing through anode exhaust conduit 308C vaporizes the preheated liquid fuel and/or partially vaporized fuel stream. The fuel vapor (e.g., alcohol vapor) mixes with the anode exhaust to produce a fuel stream that is provided to the anode exhaust cooler 140. The fuel stream is cooled in the anode exhaust cooler 140 and then provided to the mixer 180 via anode exhaust conduit 308E, where the fuel steam may be further mixed. The liquid fuel vaporization may reduce the temperature of the anode exhaust and/or fuel stream when compared to an alternative system that operates using a hydrocarbon fuel and utilizes a water injector in place of the liquid fuel injector 160 to humidify the anode exhaust. As such, the size of the anode exhaust cooler 140 may be reduced as compared to such an alternative system, which may provide space for additional stacks 102 within the hotbox 100 and a corresponding system voltage increase.

In some embodiments, additional liquid fuel may be provided to the mixer 180 via fuel inlet conduit 300B and mixed with to the anode exhaust stream output from the anode exhaust cooler 140, depending on system operating temperatures. Such additional liquid fuel may be vaporized upon contact with the anode exhaust stream and/or may be vaporized and/or further heated in the anode recuperator 110, before being provided to the stack 102.

FIG. 1C illustrates a system 10C of a third embodiment of the present disclosure. Elements that are the same as those of the system 10B will not be described for brevity. The system 10C omits the liquid fuel heat exchanger 170 and instead uses the liquid fuel injector 160 to vaporize the liquid fuel. In the system 10C, at least a portion of the liquid fuel stream is provided directly from the fuel source 30 to the liquid fuel injector 160 while bypassing the CPOx reactor 200 by actuating the fuel valve 310. For example, some or all of the liquid fuel stream output from the fuel source 30 may be diverted from fuel inlet conduit 300A by the fuel valve 310 and provided directly to the liquid fuel injector 160 via a vaporizer conduit 320D, which fluidly connects the fuel valve 310 to the liquid fuel injector 160. As such, the liquid fuel injector 160 may be configured to vaporize the liquid fuel without the liquid fuel being preheated, and the liquid fuel heat exchanger 170 may be omitted.

A start-up water inlet conduit 324 may be fluidly connected to the vaporizer conduit 320D. During the start-up mode, a water valve 326 on the water inlet conduit 324 is opened to provide liquid water into the vaporizer conduit 320D. The liquid fuel injector 160 may function as a water vaporizer in the start-up mode, and heats the water above 300° C. to generate steam during the start-up mode. The steam is provided into the mixer 180 with the anode exhaust. During the steady-state mode, the water valve 326 is closed, and the initial steam provided from the water inlet conduit 324 and/or new steam generated during the fuel cell reaction at the anode electrodes of the fuel cells is cycled in the system 10C during the steady-state operation.

Figure 4A:
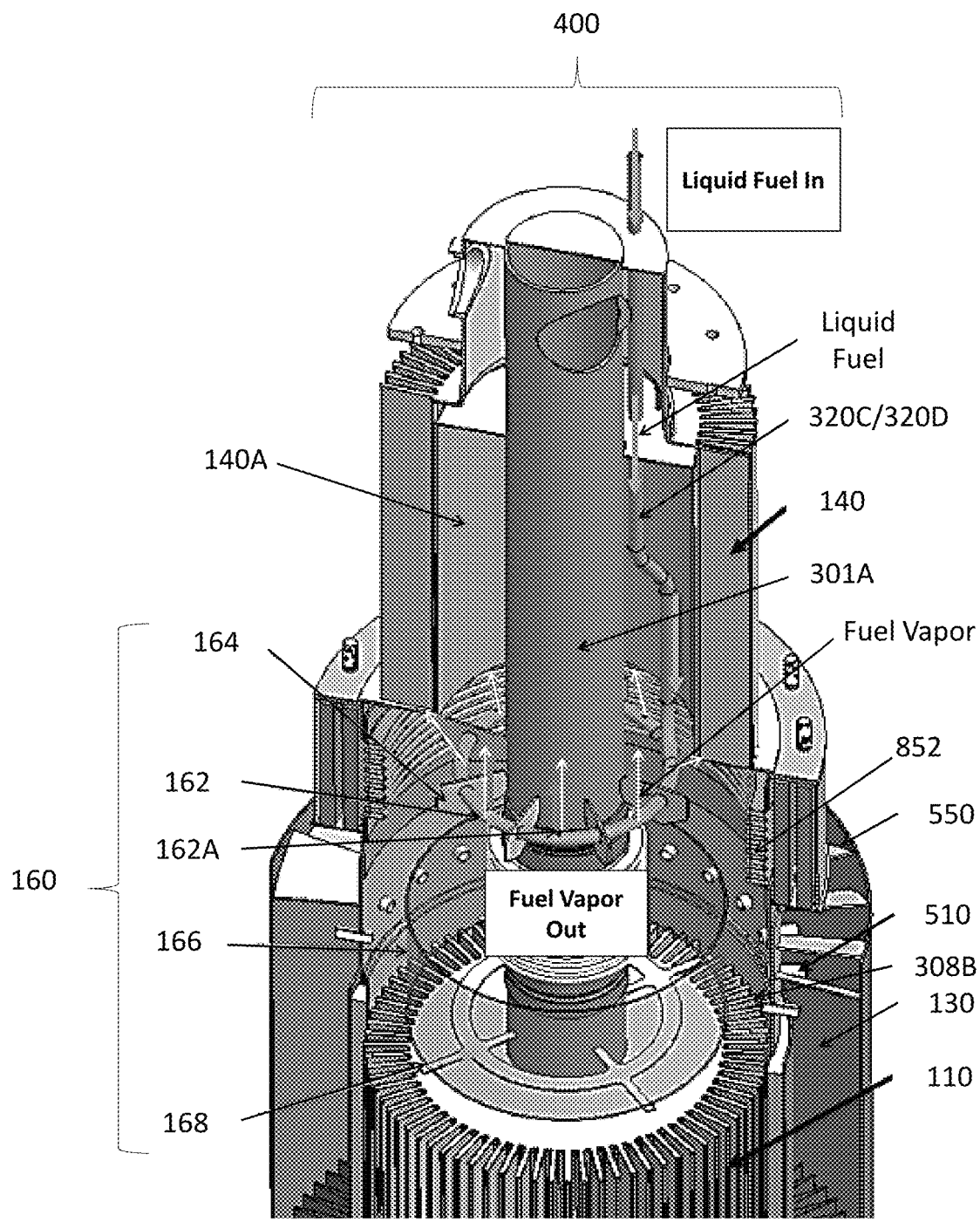
FIG. 4A is a partial perspective view of a liquid fuel injector disposed in the central column of the system of FIG. 2A.
Figure 4B:
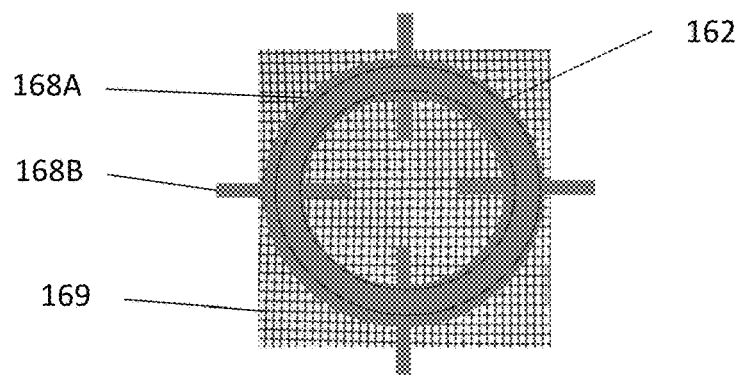
FIG. 4B is a top view of components of the water injector of FIG. 4A.
Figure 4C:
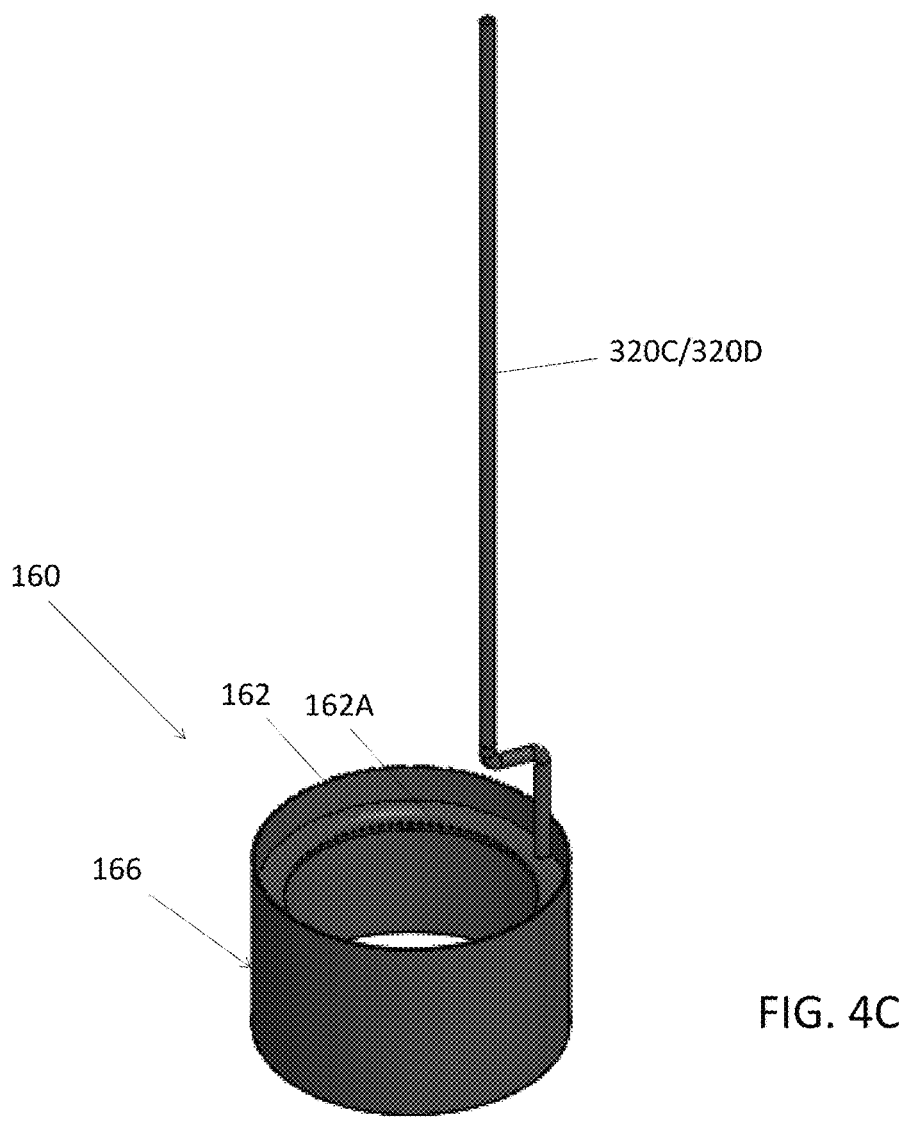
FIG. 4C is a perspective view of the liquid fuel injector, according to various embodiments of the present disclosure.

FIG. 4A is a sectional perspective view showing the liquid fuel injector 160 located in the anode exhaust conduit 308C passing the central column of FIG. 2A. FIG. 4B is a top view showing an injector ring 162 and a baffle 168 of FIG. 4A. FIG. 4C is a perspective view of the liquid fuel injector 160, according to the second and third embodiments of the present disclosure. In the embodiment of FIG. 4A, the splitter 510 may comprise tubes that extend through the outer wall of the anode exhaust conduit 308B rather than horizontal slits shown in FIG. 3A. It should be understood that either the tube or slit type of splitter 510 may be used with the liquid fuel injector 160 of the present embodiment. Referring to FIGS. 1B, 1C, 4A, 4B and 4C, the liquid fuel injector 160 may include the injector ring 162, restraint tabs 164, a shroud 166, and the baffle 168.

The injector ring 162 may be disposed inside the anode exhaust conduit 308C between the anode exhaust cooler 140 and the anode recuperator 110 and may be fluidly connected to vaporizer conduit 320C in system 10B or to the vaporizer conduit 320D in system 10C. The injector ring 162 is a tube that extends around the fuel stream conduit 301A. The injector ring 162 may include injection apertures (i.e., openings) 162A configured to inject liquid fuel and/or partially vaporized fuel directly into the first portion of the anode exhaust flowing in the conduit 308C from the splitter 510 and anode recuperator 110. The liquid fuel may be vaporized by the hot first portion of the anode exhaust. The injection apertures 162A may be configured to generate streams or droplets of liquid fuel, which may be vaporized instantaneously or within seconds of emerging from the injector ring 162. The injection apertures 162A may be located on any one or more surfaces of the injector ring 162, such as the upper surface of the injector ring 162 (as shown in FIG. 4A), the inner surface of the injector ring 162 (as shown in FIG. 4C), the lower surface of the injector ring 162 and/or the outer surface of the injector ring 162. For example, as shown in the embodiment of FIG. 4A, the injection apertures 162A may be evenly distributed on an upper surface of the injector ring 162 to provide a uniform stream upward into the anode exhaust to decrease the amount of liquid fuel dripping down toward the splitter 510. The injector ring 162 may also be sized to provide substantially uniform circumferential flow of liquid fuel therein and to minimize a pressure drop in the anode exhaust flowing thereby.

The restraint tabs 164 may be attached to the fuel stream conduit 301A and/or the shroud 166 and may be configured to support the injector ring 162. In particular, the restraint tabs 164 may be configured to align and control the orientation of the injector ring 162 and prevent uneven distribution or buildup of liquid fuel thereon. For example, the restraint tabs 164 may be configured to horizontally align the injector ring 162. The restraint tabs 164 may also prevent water from accumulating on the injector ring 162 in any particular location. As such, the restraint tabs 164 may be configured to prevent liquid fuel from accumulating on the outer surface of the injector ring 162 and dripping in only one location, which may be especially important if the injector ring 162 is not perfectly level.

The shroud 166 may be a cylinder which surrounds the injector ring 162. The shroud 166 may be configured to segregate the liquid fuel from the second portion of the anode exhaust flowing into the ATO 130 through the splitter 510. In particular, the second portion of the anode exhaust flowing outside of the shroud 166 may be directed by the splitter 510 radially outward toward the anode exhaust conduit 308D and the ATO 130, while the first portion of the anode exhaust flowing inside of the shroud 166 is directed upward by the splitter 510 toward the injector ring 162 in the anode exhaust conduit 308C. Accordingly, the shroud 166 may be configured to prevent or reduce the amount of liquid fuel and/or the first portion of the anode exhaust that has been mixed with the injected liquid fuel from being injected into the ATO 130 by the splitter 510. In other words, the shroud 166 is configured such that substantially all of the liquid fuel and the first portion of the anode exhaust are directed towards the anode exhaust cooler 140.

The baffle 168 may be disposed inside the anode exhaust conduit 308C below the injector ring 162 and around the fuel stream conduit 301A. The baffle 168 may include a baffle ring 168A and baffle tabs 168B that extend therefrom. The baffle tabs 168B may contact the fuel stream conduit 301A and the shroud 166 and may operate to keep both the shroud 166 and the baffle ring 168A aligned around the fuel stream conduit 301A within the central column 400. In particular, the baffle ring 168A may be aligned to vertically overlap with (e.g., be concentric with) the injector ring 162, as shown in FIG. 4B.

The baffle 168 may operate as a surface to catch and vaporize liquid fuel droplets that do not instantaneously transform into vapor and drip from the injector ring 162. Accordingly, the baffle 168 protects brazed joints of the anode recuperator 110 that may be located below the injector ring 162 from contact with liquid fuel droplets and the corresponding thermal shock.

In various embodiments, the liquid fuel injector 160 may optionally include a mesh 169 or porous material disposed below the baffle 168. The mesh 169 may be configured to capture any droplets that drip from the injector ring 162 and bypass the baffle 168, such that the captured droplets are vaporized before reaching the anode recuperator 110 and/or the splitter 510. Anode exhaust cooler inner core insulation 140A of the anode exhaust cooler 140 may be located between the fuel stream conduit 301A and the bellows 852.

In various embodiments, a method of operating a fuel cell system comprises providing at least a portion of an anode exhaust from the fuel cell stack 102 to the liquid fuel injector 160, supplying liquid fuel to the liquid fuel injector 160, and injecting the liquid fuel from the liquid fuel injector 160 into the at least the portion of the anode exhaust to vaporize the liquid fuel and generate a vaporized fuel mixture (i.e., a mixture of a fuel vapor and the anode exhaust).

In one embodiment, supplying liquid fuel to the liquid fuel injector 160 comprises supplying the liquid fuel in a liquid state to the liquid fuel injector 160 after the stack 102 reaches a temperature of about 300° C. or more. In one embodiment, the method also includes providing the anode exhaust from the stack 102 to an anode recuperator 110 to heat a fuel inlet stream flowing to the stack 102, splitting the anode exhaust provided from the anode recuperator into a first portion of the anode exhaust and a second portion of the anode exhaust and providing the first portion of the anode exhaust into the liquid fuel injector 160. The liquid fuel is vaporized completely or vaporized partially and entrained in the first portion of the anode exhaust stream to form a mixture of a fuel vapor and anode exhaust, while the second portion of the anode exhaust is provided into an anode tail gas oxidizer 130. The method further includes providing the mixture to an anode cooler 140 to heat air flowing to the stack 102 and providing the mixture from the anode cooler 140 into the fuel inlet stream flowing to the stack 102 through the fuel stream conduit 301A.

The fuel cell systems of the various embodiments of the present disclosure are configured to reduce greenhouse gas emissions and benefit the climate.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

The invention claimed is:

1. A fuel cell system, comprising:
a stack of fuel cells located in a hot box;
an anode exhaust conduit configured to receive an anode exhaust generated by the stack;
a vaporizer located in the hot box and configured to vaporize a liquid fuel using heat generated by the fuel cell system to form a fuel vapor; and
a fuel stream conduit configured to provide the fuel vapor to the stack,
wherein the vaporizer comprises a liquid fuel heat exchanger configured to vaporize liquid alcohol using heat extracted from at least a cathode exhaust generated by the stack.

2. The fuel cell system of claim 1, wherein the vaporizer further comprises a liquid fuel injector configured to inject a remaining portion of the liquid fuel that has not been vaporized in the liquid fuel heat exchanger into the anode exhaust conduit, such that the anode exhaust vaporizes the remaining portion of the liquid fuel.

3. The fuel cell system of claim 2, further comprising:
a first vaporizer conduit which fluidly connects an outlet of the liquid fuel heat exchanger to an inlet of the liquid fuel injector; and
a cathode recuperator heat exchanger configured to cool the cathode exhaust using air provided to the stack before the cathode exhaust is provided to the liquid fuel heat exchanger.

4. The fuel cell system of claim 2, further comprising:
an anode recuperator heat exchanger configured to heat the fuel vapor using the anode exhaust before the fuel vapor is provided to the stack; and
an anode exhaust cooler heat exchanger configured to receive the anode exhaust from the anode recuperator heat exchanger and to cool the anode exhaust using air provided to the stack.

5. The fuel cell system of claim 4, further comprising a second vaporizer conduit that extends through the anode exhaust cooler heat exchanger and is configured to supply the liquid fuel from a liquid fuel source to the liquid fuel injector.

6. The fuel cell system of claim 5, wherein:
the liquid fuel injector comprises an injector ring disposed between the anode exhaust cooler and the anode recuperator;
the injector ring is fluidly connected to the second vaporizer conduit; and
the injector ring is configured to inject the liquid fuel into the anode exhaust that flows in the anode exhaust conduit from the anode recuperator heat exchanger to the anode exhaust cooler heat exchanger.

7. The fuel cell system of claim 6, wherein the injector ring comprises injection apertures in a surface thereof and configured to inject the liquid fuel into the anode exhaust.

8. The fuel cell system of claim 1, further comprising a mixer configured to mix the fuel vapor output from the liquid fuel heat exchanger with the anode exhaust output from the anode exhaust conduit and to provide the fuel vapor into the fuel stream conduit.

9. The fuel cell system of claim 1, further comprising:
an anode recuperator heat exchanger configured to heat the fuel vapor using the anode exhaust before the fuel vapor is provided to the stack; and
an anode exhaust cooler heat exchanger configured to receive at least a first portion of the anode exhaust from the anode recuperator heat exchanger and to cool the anode exhaust using air provided to the stack.

10. The fuel cell system of claim 9, further comprising an anode tail gas oxidizer configured to receive at least a second portion of the anode exhaust from the anode recuperator heat exchanger and to oxidize the anode exhaust using the cathode exhaust to form a system exhaust comprising the cathode exhaust and an oxidized anode exhaust.

11. The fuel cell system of claim 10, further comprising:
a cathode recuperator heat exchanger configured to cool the system exhaust using air provided to the stack; and
a cathode exhaust conduit which fluidly connects an outlet of the cathode recuperator heat exchanger to an inlet of the liquid fuel heat exchanger, wherein the liquid fuel heat exchanger is configured to vaporize liquid alcohol using heat extracted from the system exhaust.

12. The fuel cell system of claim 1, wherein:
the liquid fuel comprises the alcohol an alcohol fuel; and
the fuel cells comprise solid oxide fuel cells.

13. The fuel cell system of claim 1, wherein the fuel cell system further comprises a liquid fuel source comprising a liquid fuel tank or a conduit filled with the liquid fuel.

14. The fuel cell system of claim 13, wherein the fuel cell system further comprises a vaporizer conduit fluidly connecting the liquid fuel source to the liquid fuel heat exchanger.

* * * * *